United States Patent
Sanders et al.

(10) Patent No.: US 6,213,302 B1
(45) Date of Patent: Apr. 10, 2001

(54) MULTI-CAVITY, CONTROLLED ATMOSPHERE TRAY FOR PACKAGING AND PRESERVING SLICED TOMATOES

(75) Inventors: Craig Sanders; Johnny Ray Sherrell, both of Arlington, TX (US)

(73) Assignee: Fresh Advantage, Inc., Grand Prarie, TX (US)

( * ) Notice: Subject to any disclaimer, the term of this patent is extended or adjusted under 35 U.S.C. 154(b) by 0 days.

(21) Appl. No.: 09/503,846

(22) Filed: Feb. 15, 2000

(51) Int. Cl.⁷ .................................................. B65D 81/02
(52) U.S. Cl. ........................ 206/521.1; 206/521.2; 206/521.8
(58) Field of Search .................. 206/521.1, 521.2, 206/521.6, 521.8; 426/106, 119, 124

(56) References Cited

U.S. PATENT DOCUMENTS

| | | |
|---|---|---|
| 2,418,248 | * 4/1947 | Denton . |
| 3,016,131 | * 1/1962 | Kennedy . |
| 3,421,682 | * 1/1969 | Eisenbach . |
| 3,493,164 | * 2/1970 | Edwards . |
| 4,012,530 | * 3/1977 | Holden . |
| 4,256,770 | 3/1981 | Rainey . |
| 4,411,921 | 10/1983 | Woodruff . |
| 4,423,080 | 12/1983 | Bedrosian et al. . |
| 4,528,228 | 7/1985 | Clevenger . |
| 4,556,147 | 12/1985 | Magnussen, Jr. . |
| 4,622,229 | 11/1986 | Toshitsugu . |
| 4,697,703 | 10/1987 | Will . |
| 4,753,366 | * 6/1988 | Ritter . |
| 4,757,899 | 7/1988 | Magnussen, Jr. et al. . |
| 4,842,875 | 6/1989 | Anderson . |
| 5,165,947 | 11/1992 | Colucci et al. . |
| 6,086,931 | * 7/2000 | Whiteford . |

* cited by examiner

Primary Examiner—David T. Fidei
(74) Attorney, Agent, or Firm—Lowe Hauptman Gilman & Berner, LLP

(57) ABSTRACT

A tray for packaging sliced tomatoes is disclosed that maintains the tomatoes is fresh condition by controlling the atmosphere surrounding the tomatoes and reducing contact between tomatoes and their serum exudate. This is achieved by a tray configuration that holds the tomato above the exudate which is collected in a reservoir at the base of the tray. Means are provided to facilitate loading tomatoes into the tray and for removing the tomatoes from the tray.

14 Claims, 2 Drawing Sheets

MULTI-CAVITY, CONTROLLED ATMOSPHERE TRAY FOR PACKAGING AND PRESERVING SLICED TOMATOES

FIELD OF THE INVENTION

This invention relates to food processing and packaging. The invention particularly relates to mechanically packaging sliced tomatoes as intact, whole fruit in a tray having a controlled atmosphere and so configured as to minimize contact of the fruit with liquid exudate during storage whereby the sliced tomato is preserved in a fresh condition.

BACKGROUND OF THE INVENTION

In the home, in better restaurants and in fast-food establishments the ubiquitous tomato is usually served as slices within a salad, within a hamburger or sandwich, or as garnishments to a side order. Typically, in restaurants, tomatoes are sliced as needed, or several hours earlier, which can lead to tomato slices of undistinguished consistency and freshness or some waste of the fruit. In the home, the availability of packaged, presliced tomatoes may be just another convenience in meal preparation but in the restaurant business environment, and particularly fast-food restaurants, the availability of packaged, fresh tomato slices can significantly affect the quality of the served meal, the time and ease of meal preparation, the reproduceability of the meal's quality, the cost to prepare the meal and, ultimately, the customer's satisfaction with the establishment. But developing a package for holding presliced tomatoes that meets the end-user's requirements of economy, convenience and sustained fruit-freshness has proven to be an elusive challenge to artisans of the fruit packaging industry.

Tomatoes are fragile fruit. They bruise easily; the whole fruit is sensitive to dehydration and oxidation; the pulp of the fresh sliced tomato is especially sensitive to dehydration and oxidation; and the pulp of the fresh tomato slice exudes a serum-like liquid that is an excellent media for rapid, induced bacteriological spoilage. Simply put, they are hard to handle and they are hard to preserve. Slice them and these problems become greatly exacerbated by the substantially increased surface area that is open to decay. Trying to place an intact sliced tomato into a package under rapid, low cost mass production conditions without injuring the fruit becomes a daunting, complicated challenge. Fundamentally, a freshly sliced and packaged tomato must be as storable and as transportable and as re-ripe fresh at the time of use as whole tomatoes would have been at the same time in order to be acceptable to the end-user.

U.S. Pat. No. 5,165,947 describes a package for whole (not pre-sliced) tomatoes that maintains the tomato in a relatively fixed position regardless of the orientation of the package and further maintains the tomato in a relatively uniform humidity inside the package. Maintaining the tomato in a fixed position prevents bruising or rupture of the skin of the tomato.

Contrary to this evidence of the state of the prior art, the present invention packages sliced tomatoes. According to the package of this invention, the exudate, that is unavoidably formed from the tomato slices, is minimized by maintaining the sliced tomato in an assembled condition. The package of the present invention accomplishes two (2) purposes. First, it physically directs the exudate away from the fruit in such a way as to control any adverse impact on the freshness of the tomato slices. Second, it maintains the sliced fruit in an assembled condition whereby minimizing exudation, oxidation and spoilage of the fruit. In addition, the package of the present invention is adapted to contain means that cooperate with mechanical holders that load assembled, but sliced, tomatoes and place each of them into a cavity in the package.

It is an object of the present invention to provide a package to fixedly hold, transport or store one or more intact sliced tomatoes under controlled conditions of atmosphere and humidity including means to separately accumulate exudate from the sliced tomato and thereby maintain the sliced tomato in a red-ripe fresh condition.

Another object of the present invention is to include in the cavity of a package for sliced tomatoes means to cooperate with mechanical devices that are used to load sliced tomatoes into the package cavities.

A further object of the invention is to provide a package suitable to achieve the foregoing objectives but compatible with manufacturing economies.

A still further object of this invention is to minimize the complexity of the package that holds the pre-sliced, but assembled tomatoes and to make at least a substantial portion of that package in a single step.

Still another object of this invention is to provide such a package for holding pre-sliced tomatoes that had controlled oxygen transmission (OTR) characteristics such that the inside of the package does not become anaerobic during shipment and storage.

Other and additional objects of this invention will become apparent from a consideration of this entire specification and drawing and the claims appended thereto.

In the present invention the term intact sliced tomato refers to a complete tomato that has been sliced but where the slices have been assembled, or preferably have not even been separated, so that the assembled sliced tomato resembles the whole, unsliced fruit. This enables the interior or pulp of the slices to remain in full contact with immediately adjacent slices and thereby minimize spoilage and loss of flavor.

SUMMARY OF THE INVENTION

The present invention satisfies all of the foregoing objectives in that it comprises a package that will substantially fixedly hold one or more sliced tomatoes, in an assembled condition, in one or more cavities, preferably generally cylindrical cavities, disposed in a substantially self supporting, preferably substantially rigid, tray. In a preferred embodiment, the top of the tomato holding cylinder generally corresponds to the plane of the top of the tray and, in a pre-packaged condition is open to receive the assembled sliced tomato. The bottom of the cylindrical cavity is closed and has both a depression therein for accumulating tomato exudate, and a raised portion (sometimes referred to as a button) that is adapted to cooperate with the stem scar to help keep the stored sliced tomato away from its exudate. After the sliced tomato is placed in the, preferably cylindrical, cavity, the top of the tray, including the top of the cylinder, are hermetically covered and protected by a clear or opaque polymer film selected from those films that will transmit oxygen, ethylene, carbon dioxide and water vapor in an amount sufficient to maintain the tomato slices in a fresh and red-ripe condition.

In a preferred form of this invention, the interior wall of the cavity contains at least two generally opposed groves that start at the top of the cavity and extend down the cavity wall in a direction toward the cavity bottom. The groves may extend part way or all the way down the wall of the cavity in which case they may terminate at the intersection of the cavity wall with the cavity bottom, or sometimes at a higher elevation displaced from the bottom of the cavity. The groves are recessed and may be curved in an arc or V shape. The depth of the grooves will be whatever is sufficient to correspond to and accommodate the prongs used to grasp the assembled sliced tomato and insert the it into the cavity.

It is considered to be within the scope of this invention for the tomato housing cavity to be cylindrical in cross section, preferably a right circular cylindrical cross section. However, the cavity could have a conical or a frustro conical or eliptical cross section. It is also considered to be within the scope of this invention for the cross section to be rectangular, preferably square, or some combination of several of these geometric figures. The cross section of the cavity may only approach these geometric figures. For ease of understanding and enablement, sometimes the cavities are referred to herein as being cylindrical cavities. The use of this term should not be considered to be limiting but rather illustrative of the cavities of this invention.

Optionally, a minor portion of the cavity wall extending from the top of the cylinder at the plane of the top of the cavity to a point preferably not more than about half way down the length of the cylinder is a single rectilinear or arched opening. The opening is at least large enough to allow access to the assembled sliced tomato in the cavity. Where the tray contains multi-cavities, the opening may be a single common opening for adjacent cavities or in the alternative may be a series of openings that are covered by the same overlay.

The bottom of the cavity is designed to provide a recession or grove, preferably at least partially annular in cross section to act as a well or reservoir to collect and hold, out of contact with the tomato, liquid exuded by the sliced tomato that is disposed in the cavity. In a preferred design, the center portion of the cavity bottom within the circle described by the annular reservoir is elevated to form a preferably hemispheric blister or cone or button that rises above the plane of the cylinder bottom and occupies a minor portion of the area of the cylinder bottom. The recessed well or grove is preferably formed around the elevated blister between the edge of the blister and the intersection of the cylinder wall and bottom. The grove is substantially recessed below the plane of the bottom sufficient to accommodate exudate from the tomato. It is also considered to be within the scope of the instant invention that there may be plural recesses and that the recess or recesses may be of different shapes that annular. A truncated annular groove is used for illustrative purposed and should not be considered to be a limitation on the scope of this invention.

The invention is a tray for packaging and preserving sliced tomato(es) in a fresh condition. The tray comprises a substantially rigid container comprising at least one recessed cavity shaped and adapted o hold an assembled sliced tomato, or in fact a plurality of abutting slices of tomato or other fruit or vegetable, in a firm position, said cavity having side walls and a bottom wall. Where the side walls are not tight again t the periphery opf the tomato or other fruit or vegetable, they preferably contain at least two generally opposed straight groves extending from the top of the tray at the opening of the cavity, down the side wall in a direction substantially perpendicular to the bottom wall. The bottom wall contains at least one portion elevated above the mean plane of the bottom wall that is adapted to support a sliced tomato or other fruit or vegetable, and a trough recessed below the mean bottom plane that preferably substantially circumscribes the elevated central portion of the bottom wall and is adapted to collect exudate released by the sliced fruit or vegetable, e.g. tomato.

Where the container or tray has multiple cavities, with at least two cavities being connected by a portion of their side walls being in common, a minor portion of the common side wall that extend from the top of the tray substantially half way down the common side wall may be absent to allow access to the tomatoes contained in both cavities.

DETAILED DESCRIPTION OF THE INVENTION

The tray of the present invention is suitable for manual packaging of sliced tomatoes but, more preferably, the tray is suitable for automated packaging of red-ripe sliced tomatoes. Because of the attributes of the tray, sliced tomatoes can be stored, transported and distributed to the consumer in fresh, red-ripe condition. An intact sliced tomato can be lifted in the intact condition by prong-like fingers, suitably of metal, ceramic or plastic, softly placed in a cavity of the tray and the prongs withdraw. The slices of the tomato are firmly held together in the cavity wherein they are in full contact with each other. This condition retards the release of liquid exudate from the tomato and protects the tomato pulp from undue exposure to the atmosphere.

While the placement of the sliced tomato in the tray of the invention slows the rate of flow of liquid exudate from the tomato slices, some exudate will inevitably be produced and flow to the bottom of the cavity to form a pool of liquid serum. This pool of exudate or serum is rich in available nutrients and is an excellent media for the growth of bacteria. If the tomato is allowed to rest in contact with the pool of serum, spoilage of the tomato will be accelerated and the freshness of the tomato will quickly dissipate. But the tray of the invention is configured to avoid the problem. First, the tray contains at least one elevated cone or blister that is preferably centered in the bottom of the cavity and raised above the bottom so as to be adapted to engage the stem scar of the tomato. The sliced tomato rests on the at least one blister and is thereby raised above the cavity bottom. Secondly, the tray bottom contains at least one groove or recess that serves as a reservoir to collect liquid exudate and hold it below the cavity bottom. Accordingly, the sliced tomato does not rest in contact with any pool of liquid serum and is reasonably unaffected by bacteriological processes occurring in the pool that may impair the freshness of the sliced tomato.

Figure 1:
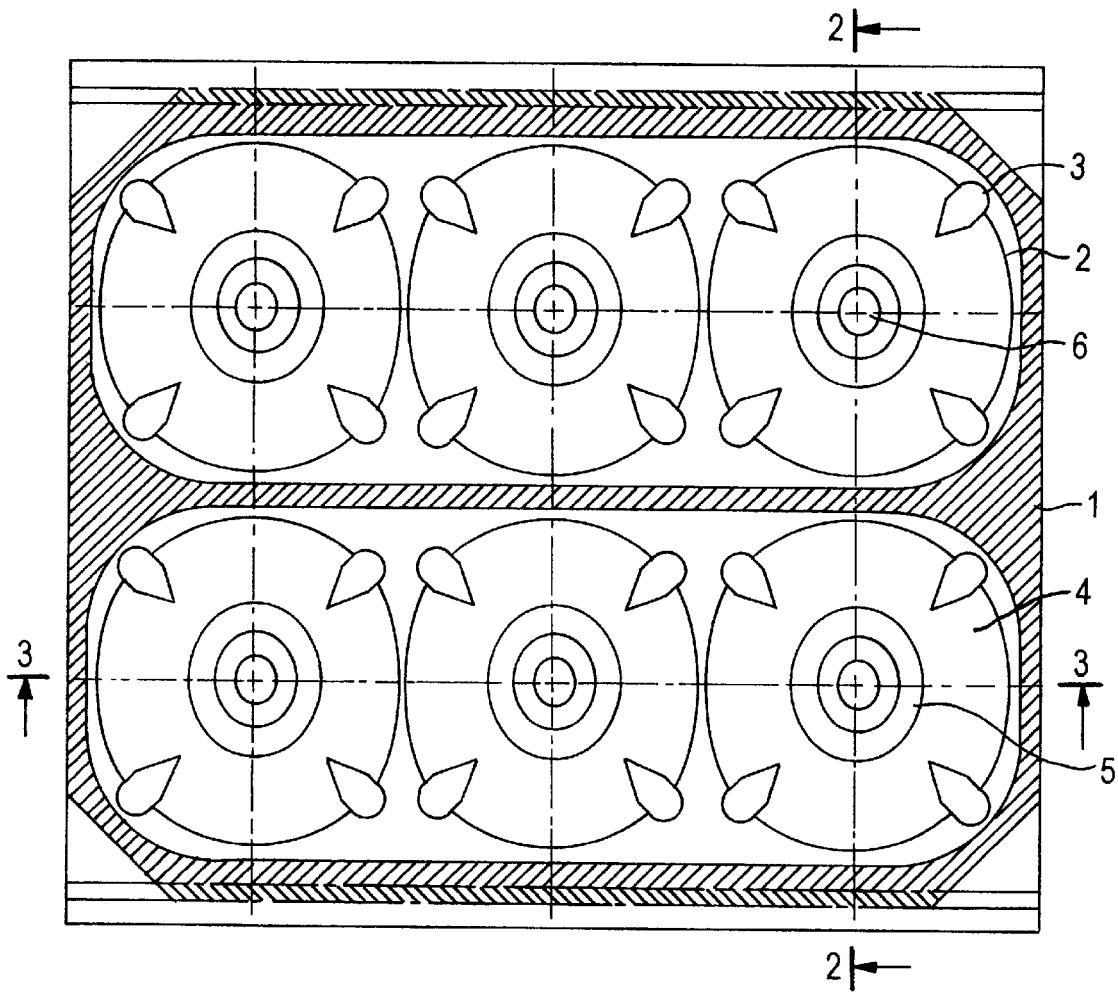
FIG. 1 is a plan view of the package of the invention, including a tray with cylindrical cavities, suited to sliced tomatoes.

Referring to the drawing, FIG. 1 illustrates a plan view of a preferred embodiment of the tray of the invention containing six cylindrical cavities (2) that can hold six sliced tomatoes. The rigid tray is preferably molded from plastic resin such high impact polystyrene, acrylonitrile-butadiene-styrene (ABS) or the like, but may as well be manufactured from other packaging materials known in the art such as aluminum or even coated paper or cardboard. When filled with sliced tomatoes the tray top (1) is covered and sealed with a plastic film, such as oriented polypropylene, polyethylene or polyvinylidene chloride (saran) or the like. The film selected must be strong enough to protect the contents of the cavities during handling and storage and yet has properties sufficient to control the transmission of gases such as oxygen, ethylene, carbon dioxide and water vapor around the contents so as to aid in maintaining the freshness of the sliced tomatoes.

The cylindrical cavity wall (2) of FIG. 1 contains grooves (3) recessed into the wall. The number of grooves recessed in a cylinder wall may vary from two (2) or more but preferably four (4). The grooves extend from the top of the cavity to substantially down the length of the wall, preferably to the bottom of the cylinder. These grooves are included and designed to assist in the loading of the intact sliced tomato into the cavity by cooperating with a pronged tool that grasps a sliced tomato, slides the prongs holding the tomato into the groves in the cylinder wall, releases the sliced tomato, and the tool is extracted.

FIG. 1 also illustrates a plan view of the novel molded design of the bottom (4) of the cavity. That portion of the bottom which is elevated above the mean plane (4) of the bottom of the cylinder is noted as (6). Here it is illustrated in a semi-circular form but it may as well be a rectilinear shape or any raised shape than will serve the purpose of a point of contact for the bottom of the sliced tomato. A recessed well (5) surrounds the point of contact and is depicted preferably as an annular reservoir below the mean plane of the cylinder bottom (4). It is not critical that the reservoir be annular in shape as any geometric shape that is compatible with forming a recess below the mean plane of the cavity bottom will suffice.

Figure 2:
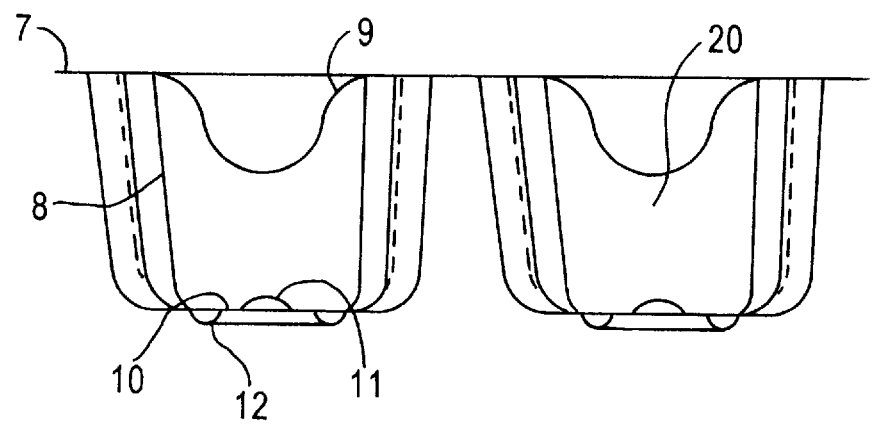
FIG. 2 is a side interior view of the cylindrical cavities in the tray of the package of the invention along the A—A direction shown in FIG. 1.

FIG. 2 is a side view of the tray of the invention along section A—A of FIG. 1. Important features depicted in FIG. 2 include the cutaway (9) of the common cavity wall (20) between the middle cylinders and the end cylinders of the tray. The wall cutaway adds to the convenience for the end-user in removing the sliced tomatoes from the package. FIG. 2 also depicts the tray top overhang (7) and the fact that the cavity wall is preferably inwardly slanted (8) in a frustro-conical shape. A side view is also provided of the raised blister (11) that supports the tomato above the mean plane of the bottom and the recessed annular serum collection reservoir (12) portion of the cavity bottom (10).

Figure 3:
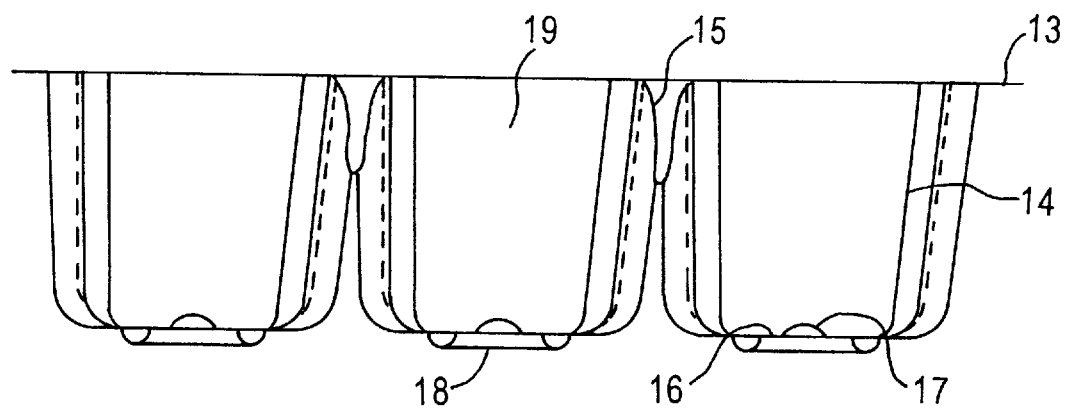
FIG. 3 is a side view along the length of the tray of the cavities of the package of the invention along the direction B-Bas shown in FIG. 1.

In FIG. 3, a side view of the tray of the invention, taken along line B—B of FIG. 1, is depicted. The tray top edge (13) and the slanted conical cavity wall (14) are shown. Notation (15) is a side view of the cutaway of the cavity walls between the middle and both end cavities shown as (9) in FIG. 2. The important features of the bottom (16) of the cavity are shown including the raised portion (17) of the bottom and the annular recession (18) below the bottom plane (16). While serving as a reservoir for collect serum the recessed portion (18) serves as the base or support for the tray and its contents of sliced tomatoes.

What is claimed is:

1. A tray for packaging and preserving at least one article, comprising a sliced fruit and/or vegetable, in a fresh condition comprising:
   a self supporting container having at least one recessed cavity adapted to hold said article in a substantially fixed position, said cavity having side walls and a bottom wall; said side walls being adapted to at least partially closely touch a portion of the outside wall of said article; said bottom wall containing at least one portion elevated above a mean plane of the bottom wall and being adapted to support said article; and at least one recess disposed below said mean bottom plane adapted to collect exudate released by said article and adapted to separate said article from said exudate when said tray is in a position such that said bottom wall is lower than the walls of said cavity; and at least one overlying film form material disposed over an opening to said cavity and adhered to said tray; wherein said overlay comprises a material that is partially transparent to oxygen, water vapor, ethylene and carbon dioxide in amounts such that the interior of said cavity is not anaerobic and has a water vapor content.

2. The container of claim 1 having at least two recessed cylindrical cavities connected by a portion of side wall in common, wherein a minor portion of said common side wall extending from the top of the tray substantially half way down the common side wall is absent, whereby access to the articles contained in both cavities is enhanced.

3. The container of claim 2 wherein said side walls contain at least four generally opposed straight groves extending from the top of said cavity toward the bottom wall thereof.

4. The container of claim 2 wherein said elevated portion is in the form of a hemisphere.

5. The container of claim 2 wherein the bottom of said recessed portion of said bottom wall is curved.

6. The container of claim 2 wherein the top of the tray is hermetical sealed by plastic film.

7. The Container claimed in claim 1 wherein said film comprises oriented polypropylene film.

8. The container as claimed in claim 1 wherein said tray comprises high impact polystyrene.

9. The container as claimed in claim 1 wherein said tray is molded in one piece.

10. The container as claimed in claim 1 wherein said article comprises at least one sliced tomato.

11. The container as claimed 10 wherein said tray comprises a plurality of cavities contain a plurality of sliced tomatoes.

12. The container as claimed in claim 10 wherein said tomato comprises at least one slice having a stem scar and wherein said stem scar is adapted to mate with said upwardly projecting elevated portion.

13. The combination of a container, comprising a tray section and an overwrap section, with at least one fruit;
   wherein said tray section comprises a top surface and at least one cavity extending away from said top surface;
   wherein said cavity comprises a bottom wall and at least one side wall;
   wherein said fruit is disposed within said cavity;
   wherein said side walls are sized so as to meet at least a portion of the outside surface of said fruit;
   wherein said bottom wall comprises at least one recess disposed away from said fruit and at least one raised portion extending toward said fruit;
   wherein when said container is in a position with said bottom wall in a downmost position, said fruit is disposed on said raised portion; and
   wherein said overwrap comprises a material that is at least partially transparent to oxygen, and ethylene to an extent sufficient to maintain an aerobic atmosphere containing water vapor in said cavity.

14. A container as claimed in claim 13 wherein said overwrap comprises oriented polypropylene film and said tray comprises molded high impact polystyrene.

* * * * *